United States Patent Office 3,482,655
Patented Dec. 9, 1969

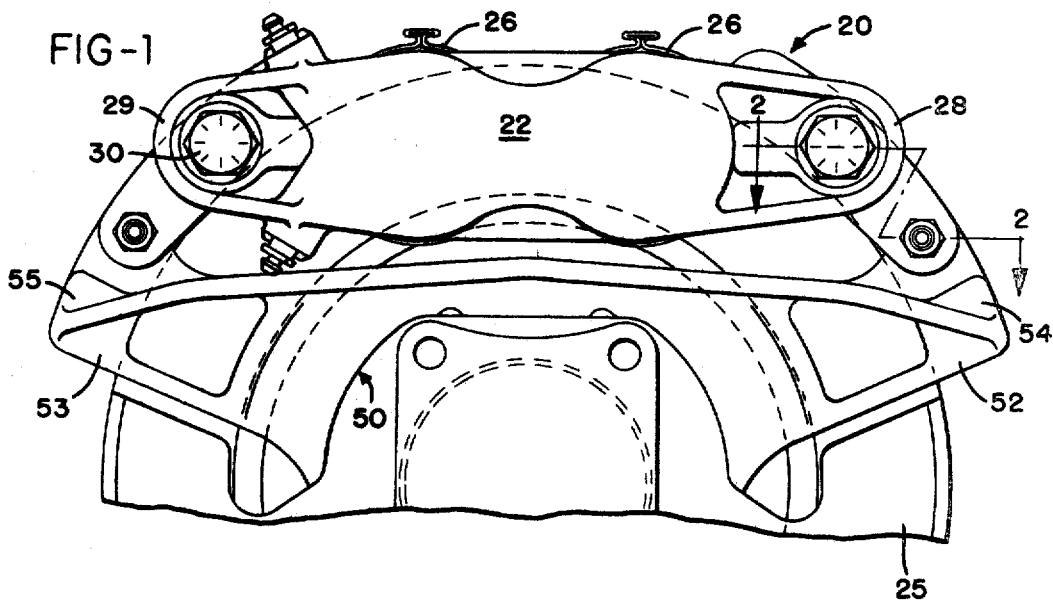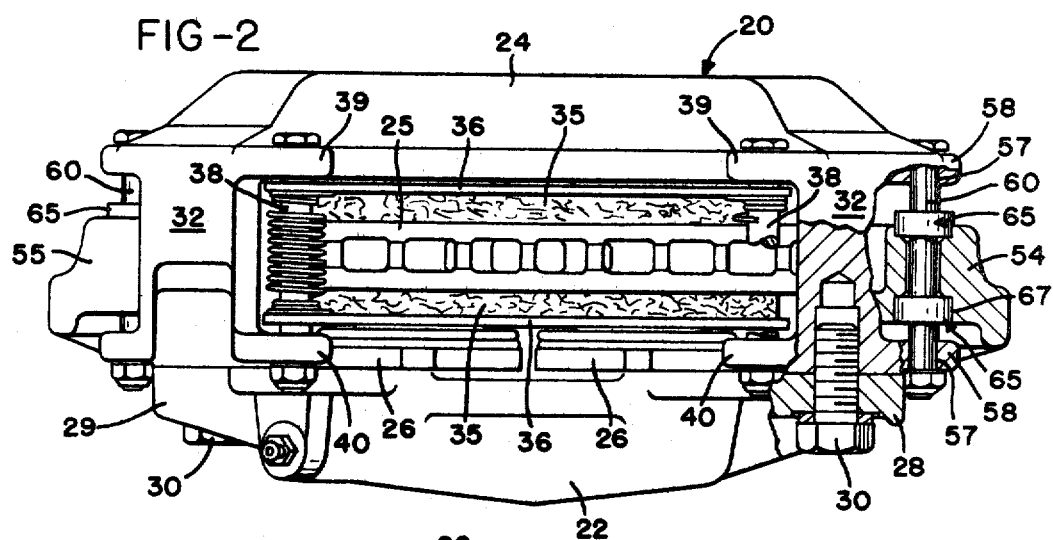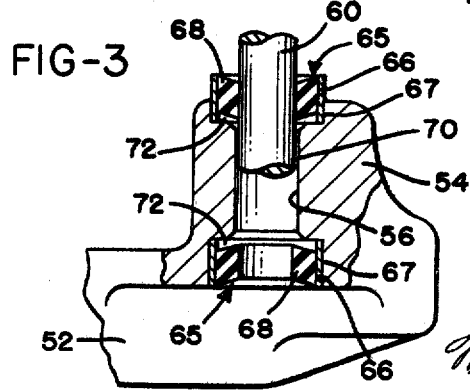
INVENTOR
WILLIAM D. WALTHER

3,482,655
DISK BRAKE AND ADJUSTING
MEANS THEREFOR
William D. Walther, Dayton, Ohio, assignor to The
Dayton Steel Foundry Company, Dayton, Ohio,
a corporation of Ohio
Filed June 20, 1968, Ser. No. 738,597
Int. Cl. F16d 55/224, 65/52
U.S. Cl. 188—73                            2 Claims

ABSTRACT OF THE DISCLOSURE

The floating caliper type disk brake in which the braking pads are mounted within the caliper and the caliper is, in turn, mounted for axial sliding movement on a pair of torque arms, in which resilient elastomeric bushings are received in the torque arms and grip an axial pin mounted on the caliper housing. The bushings center the caliper housing pins, absorb vibration, form a retraction spring for the reaction brake pad, and prevent inertial knock-back of the hydraulic piston by restraining the caliper housing against excessive movement.

BACKGROUND OF THE INVENTION

Spot type disk brakes are commonly made with caliper housings which encircle only a peripheral portion of the brake and which are, in turn, mounted on torque arms. Frequently, such caliper housings incorporate hydraulic piston units on one side only and are thus mounted for axial aligning movement so that braking force is applied to the opposite pad through a reaction portion of the housing.

In "floating" caliper disk brakes of this type, a serious problem arises due to shock and vibration of the caliper over a period of time when the brakes are not used. The shock and vibration loading of the caliper will cause a corresponding loading to be placed on the hydraulic piston unit or units within the caliper. Since these piston units cannot move forwardly toward the disk they tend to move rearwardly, with the result that the piston units begin to creep inwardly, and displace hydraulic fluid in doing so. After a period of time, the pistons will be so far back in their cylinders that the master cylinder will not have sufficient displacement to engage the brakes. This is known in the art as "inertial knock-back" of the pistons. This problem is severely aggravated in a floating caliper type of brake, where the caliper is free to move axially on its supports, and the more the piston moves back, the more the freedom is provided for the caliper to move with vibrations, road shocks, and the like.

A further problem with floating caliper type disk brakes is that of providing a positive retraction movement for the reaction side of the caliper. There are many mechanisms in the art for automatically retracting the piston unit on the pressure side. Generally, the piston unit is low in mass and is easily retracted. This is not so for the caliper which is of substantially higher mass. In the absence of some positive form of retraction, frequently the pad on the reaction side remains in a dragging or rubbing condition with respect to the disk following the release of the brake.

A still further problem with floating caliper brakes is that of noise incurred by the rattling of the caliper on its sliding mounts. Clearances must be provided between the sliding surfaces of the caliper housing and the torque arms, to provide ease of aligning movement as well as to permit ease of assembly. The arcuate distances between the opposite mounting locations is usually relatively great and presents the usual problem of clearance stack-up. Thus, a sufficient clearance often results in a caliper which rattles when the brake is not in use.

It has been proposed to insert bonded rubber bushings in the torque member arms, for the purpose of damping down vibration when the brake is idle, as shown in Butler 2,784,811 of 1957. However, Butler was not concerned with providing for positive retraction of the reaction pad, nor was he apparently concerned with the problem of knock-back. Further, in Butler all of the braking torque is transmitted through the rubber bushings and thus the effectiveness of the bushing could be lost due to enlargement, deformation or wear of the bushings.

SUMMARY OF THE INVENTION

This invention is directed to an improved caliper type disk brake, and more particularly to a resilient bushing mounting arrangement for the caliper housing which deforms to cause braking torque to be transmitted directly from the caliper housing to the torque arms, and which forms a gripping action preventing excessive or unwanted movement of the caliper housing axially of the disk. The gripping force of the mounting is readily overcome by braking force to permit shifting of the caliper to accommodate wear of the linings. The gripping resilient bushings of this invention deform slightly with normal braking, to provide a retraction device for the reaction friction pad, and operates to retain the caliper in a predetermined position, absorb shock, and prevent knock-back of the hydraulic piston units.

The preferred embodiment of the invention comprises an improvement in the caliper mounting arrangement shown in the patent of Walther et al. 3,384,203 issued May 21, 1968, and assigned to the same assignee as this invention. One or more bushings formed of an elastomeric material frictionally grip the outer surface of a pin carried on the caliper housing and extending through an axial bore formed in the torque arms. The bushings are deformable radially with the transmission of torque from the caliper housing to the torque arms, permitting the pin to come into direct torque-transmitting engagement with the walls of the openings formed in the torque arms.

It is accordingly an important object of this invention to provide a floating caliper type disk brake with an improved anti-knock-back resilient mounting for the caliper housing.

A still further object of this invention is the provision of a brake, as outlined above, in which bushings grippingly receive an axially slidable torque-transmitting pin and which grip the pin with sufficient force to prevent unwanted movement of the caliper housing while permitting a restricted or controlled degree of movement by reason of deflection of the bushing both in an axial and in an arcuate direction, which gripping force may readily be overcome by the braking force to reposition the caliper housing as required by the wear of the linings or brake pads.

These and other objects and advantages of the invention will be apparent from the following description, the accompanying drawings and the appended claims.

BRIEF DESCRIPTION OF THE DRAWINGS

FIG. 1 is an elevational view of a brake made according to this invention;

FIG. 2 is a plan view, partially in section, of the brake of FIG. 1, with the sectioned portion being taken generally along the line 2—2 of FIG. 1; and FIG. 3 is an enlarged fragmentary sectional view showing the details of the mounting arrangement of the caliper housing on the torque arms.

DESCRIPTION OF THE PREFERRED EMBODIMENT

Referring to FIG. 1, a caliper type disk brake is shown as being constructed generally according to the teachings of the above-mentioned Walther et al. patent although the inventive concepts hereof may be applied generally to other types of floating caliper disk brakes. The disk brake shown in FIGS. 1 and 2 is of the balanced type, in which the pressure and reaction portions of the caliper housing occupy directly opposite arcuate portions of the disk, so that clam-shell movement of the housing is effectively prevented, as described in the Walther et al. patent.

The caliper housing is shown at 20 in FIGS. 1 and 2 and has a removable pressure portion 22 and a reaction portion 24, positioned on opposite sides of a disk 25. The pressure portion 22 of the caliper housing 20 receives a pair of side-by-side hydraulic piston units indicated generally at 26 in FIG. 2. The internal details of the piston units are not shown, and any suitable hydraulic or fluid force transmitting unit may be used. Thus, the piston unit may be constructed as shown in the above-mentioned Walther et al. patent or preferably may be constructed as shown and claimed in the copending application of Afanador Ser. No. 647,455, filed June 20, 1967 and assigned to the same assignee as this invention.

The pressure portion 22 is formed with a pair of transversely extending arms 28 and 29 which connect to the reaction portion 24 by means of bolts 30. The bolts are threaded into knuckles 32 formed integrally with the reaction portion 24, which knuckles extend in straddling and overlying relation to the periphery of the disk. The knuckles 32 are formed generally in axial alignment with the ends of the arms 28 and 29 and are arcuately spaced apart to form an open-top caliper through which the pads of friction material and their associated backing plates may be inserted or removed.

In the present embodiment, a pair of substantially identical pads 35 and backing plates 36 are received within the caliper housing on each side of the disk, with the backing plates being slidably received on a pair of torque-receiving pins 38 rigidly mounted on ears 39 and 40 extending inwardly of the knuckles 32. In this manner, torque from the friction pads 35 and plates 36 is transmitted directly to the caliper housing at the knuckles 32.

The brake further includes a fixed torque member 50 having a pair of arcuately spaced arms 52 and 53 (FIGS. 1 and 2) which extend radially adjacent one side of the disk 25 and which terminate at upper ends 54 and 55 in overlying relation to the periphery of the disk. The upper ends 54 and 55 each include identical means for supporting the caliper housing 20 for self-aligning axial movement, and are each formed with an axial bore 56 (FIG. 3) in general axial alignment with corresponding openings 57 formed in spaced-apart lugs 58 in the knuckles 32. A pair of bolt-like pins 60 are supported on a caliper housing 20 rigidly in axial alignment through the caliper housing openings 57 between the lugs 58 and extend through the openings 56 on the torque arm ends 54 or 55. The pins 60 support the caliper housing on the torque arms and transmit the braking torque from the caliper hoursing to the torque arms while providing for axial aligning movement of the caliper housing with respect to the disk 25.

Elastomeric means are provided within each of the torque arm openings 56 for grippingly engaging the outer surfaces of the associated pin 60 while resisting axial sliding movement of the pin 60 through the arm ends 54 and 55. These comprise a pair of elastomeric bushings 65 formed or positioned in each of the arm ends. The bushings 65 are each provided with an outer metallic retaining band 66, press fitted within counterbores 67 formed in the torque arm ends 54 and 55 at the opposite ends of the openings 56.

A molded annular insert 68 of elastomeric material, such as neoprene rubber, is bonded or otherwise held within the retaining band 66 and extends or projects partially into the opening 56, and thus has an inside diameter which is somewhat less than that of the aligned opening 56.

The inside diameter of the insert 68 is also slightly less than the outside diameter of the pin 60. The pin 60 can be inserted by slightly deforming the material of the insert 68 so that the bushing 65 grips the outer surface of the pin. Also, the pin 60 is formed with a diameter somewhat less than that of the opening 56 so that the pin 60 moves freely through the opening 56, and when retained centrally therein by the bushings 65, defines with the opening 56 an annular clearance space 70, as shown in FIG. 3.

The elastomeric material 68 of the bushings 65 is further radially deformable to permit the pins 60 to come into full contact with the wall surfaces defined by the openings 56 under the influence of braking torque. In this manner, the bushings 65 carry only a small and predetermined amount of the braking torque, with the major portion of the torque being transmitted directly from the pin 60 to the torque member 50.

The elastomeric material of the bushing insert 68 grips the pin 60 with sufficient force to restrain the caliper housing against axial shifting movement due to road shocks and vibration. For example, a force of fifty pounds may be required to reposition each pin 60 when received in a pair of the bushings 65 in an arm end 54 or 55. Thus, while the brake is not being used, the bushings 65 effectively retain the housing in its relative position. In this manner, excessive excursion movements of the housing are avoided, vibration input into the housing is damped, and knock-back of the hydraulic pistons within their cylinder bores is substantially reduced or eliminated.

The gripping force exerted by each of the bushings may be readily overcome with the substantially greater axial force applied by the piston units, so as to effect slippage of the pins 60 with the bushings 65 when it is necessary to reposition the caliper housing, such as may be necessary due to the wear of the linings. However, before slippage occurs, the pins 60 move axially under restraint of the elastomeric insert 68, from 0.010 to 0.050 inch for examble, by reason of axial deformation, such as would occur in a normal braking application. For this purpose, there is provided an axial space 72 between the inserts and the base of the counterbores 67 into and away from which the inserts may move with the usual braking movement of the caliper housing 20 before repositioning occurs. Upon the release of the brakes, the elastomeric inserts 68 tend to return to their original position, thus urging the caliper housing in a direction to cause retraction of the reaction portion 24 and the adjacent pad 35.

The bushings 65 have the further important function of sealing the outer surfaces of the pins 60 and the inner surfaces of the openings 56 against corrosion. Also, they act as seals to retain a lubricant, if desired, within the space 70. Such a lubricant may consist of molybdenum disulfide.

It will therefore be seen that this invention provides an improved floating caliper type disk brake and an improved mounting arrangement for the caliper housing on the torque arms which provides for automatic retraction of the caliper reaction portion and which prevents unwanted excursions and movements of the caliper housing when the brake is not in use. The bushings are of simple construction and may readily be replaced in the field when worn. On the other hand, since the bushings are not required to carry the torque loading, they have a relatively long and trouble free service life. Further, the need for additional seals at the torque-receiving end transmitting pads is eliminated since the bushings further serve as sealing members in relation to the outer surface of the pins 60 and the inner surface of the openings 56.

While the form of apparatus herein described constitutes a preferred embodiment of the invention, it is to be understood that this invention is not limited to this precise form of apparatus, and that changes may be made therein without departing from the scope of the invention.

What is claimed is:

1. A spot type disk brake comprising a disk, a caliper housing straddling a peripheral portion of such disk and having a piston unit on one side thereof and an opposite reaction side, a pair of friction plates carried in said caliper housing on either side of such disk and arranged to transmit braking torque to the caliper housing, a torque member having a pair of arcuately spaced-apart arms extending to a region adjacent the periphery of said disk, means mounting said caliper housing for generally axial movement on said arms including a pair of generally axially oriented pins one for each of said arms, means in each of said arms defining a pin-receiving opening, and means in said caliper housing defining further pin receiving openings in axial alignment with said arm openings, said pins being extended through said axially aligned openings of said arms and said caliper housing providing for said axial movement by the relative sliding movement of said pins with respect to said arms, bushing means in each said openings including an annular outer retainer band and an insert of elastomeric material grippingly engaging the outer surface of said pin and resisting said axial movement, each said band defining with the associated said arm an axial space adjacent said elastomeric material, said material being deformable into said space to permit limited said axial movement during braking and providing for the return movement of said caliper housing at the conclusion of said braking, said bushing material further being radially deformable during braking to permit direct torque transmitting engagement of said pins with one of said openings for the transmission of braking torque from said caliper housing to said arms, the gripping force between said bushings and said pins being sufficient to restrain said caliper housing against shifting movement due to road shocks and vibration, but being readily overpowered by said piston unit to provide for repositioning of said caliper housing with wear of the lining.

2. In a spot type disk brake in which a caliper housing straddles a peripheral portion of a disk, and a pair of friction plates are carried in said caliper housing on either side of the disk, and a torque member having arcuately spaced-apart arms extends to a region adjacent the periphery of said disk, the improvement in means mounting said caliper housing on said arms comprising a pair of axially oriented pins one for each of said arms, means in each of said arms defining a pin-receiving opening, means mounting said pins on said housing and extending through said arm openings providing for axial aligning movement of said housing relative to said arms by the sliding movement of said pins within said openings, at least one elastomeric bushing member in each said opening, said member having an outer circular band supporting an annular insert of elastomeric material and defining with said arm an axially positioned clearance space adjacent said material, said material grippingly engaging the outer surface of the associated said pin and resisting said axial movement while being deformable into said clearance space to permit limited said axial movement during braking and providing for the return movement of said caliper housing at the conclusion of said braking, said bushing material being radially deformable during braking to permit engagement of each said pin with its associated said arm for the transmission of braking torque, the gripping force between said bushings and said pins being sufficient to restrain said caliper housing against shifting movement due to road shocks and vibration, but being readily overpowered by braking force to provide for repositioning of said caliper housing with wear of the lining.

References Cited

UNITED STATES PATENTS

| | | | |
|---|---|---|---|
| 2,533,186 | 12/1950 | Bricker et al. | 188—73 |
| 3,199,635 | 8/1965 | Bessler et al. | 188—73 |
| 3,375,906 | 4/1968 | Hayes | 188—73 |
| 3,384,203 | 5/1968 | Walther et al. | 188—73 |

FOREIGN PATENTS

| | | |
|---|---|---|
| 565,708 | 3/1958 | Belgium. |

GEORGE E. A. HALVOSA, Primary Examiner

U.S. Cl. X.R.

188—196